(12) United States Patent
Foresto

(10) Patent No.: US 11,319,899 B2
(45) Date of Patent: May 3, 2022

(54) MODULE OF AN AIRCRAFT BYPASS ENGINE OF WHICH ONE ARM INTEGRATES A STATOR BLADE

(71) Applicant: SAFRAN AIRCRAFT ENGINES, Paris (FR)

(72) Inventor: Paul Antoine Foresto, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 348 days.

(21) Appl. No.: 16/455,126

(22) Filed: Jun. 27, 2019

(65) Prior Publication Data

US 2020/0332743 A1    Oct. 22, 2020

(30) Foreign Application Priority Data

Jun. 28, 2018   (FR) ...................................... 1855840

(51) Int. Cl.
*F02K 3/02*       (2006.01)
*F02K 3/075*      (2006.01)

(52) U.S. Cl.
CPC .............. *F02K 3/025* (2013.01); *F02K 3/075* (2013.01)

(58) Field of Classification Search
CPC .. F02K 3/02–077; F01D 17/162; F01D 17/14; F01D 9/02; F01D 17/05; F04D 29/563; F05D 2220/36
See application file for complete search history.

(56) References Cited

U.S. PATENT DOCUMENTS

| | | | | |
|---|---|---|---|---|
| 4,972,671 | A | | 11/1990 | Asselin et al. |
| 5,203,163 | A | * | 4/1993 | Parsons ..................... F02C 6/08 60/226.1 |
| 10,221,707 | B2 | * | 3/2019 | Paradis ..................... F01D 9/02 |
| 10,577,956 | B2 | * | 3/2020 | Northall ..................... F01D 5/141 |
| 2016/0230584 | A1 | * | 8/2016 | Grover ..................... F01D 9/041 |

(Continued)

FOREIGN PATENT DOCUMENTS

| | | |
|---|---|---|
| EP | 0342087 A1 | 11/1989 |
| FR | 3004749 A1 | 10/2014 |

(Continued)

OTHER PUBLICATIONS

Preliminary Research Report and Written Opinion received for French Application No. 1855840, dated Mar. 18, 2019, 7 pages (1 page of French Translation CoverSheet and 6 pages of original document).

*Primary Examiner* — Todd E Manahan
*Assistant Examiner* — Rodolphe Andre Chabreyrie
(74) *Attorney, Agent, or Firm* — Womble Bond Dickinson (US) LLP

(57) ABSTRACT

The invention relates to a module of an aircraft bypass engine including an annular flow path of a secondary flow of gas wherein is mounted an annular row of stator blades configured to straighten the gas flow, an arm extending in the flow path downstream from said annular row of blades and being connected physically to one of the stator blades so as to form a unitary aerodynamic assembly, wherein at least one of the two blades adjacent to the blade of the unitary aerodynamic assembly is of a variable pitch type and capable of being rotationally moved about a substantially radial axis with respect to a longitudinal axis of the engine.

16 Claims, 2 Drawing Sheets

(56) References Cited

U.S. PATENT DOCUMENTS

| | | |
|---|---|---|
| 2017/0058831 A1 | 3/2017 | Bryan et al. |
| 2018/0030843 A1* | 2/2018 | Damevin ................ F01D 5/141 |
| 2018/0038235 A1* | 2/2018 | Damevin .............. F04D 29/544 |
| 2018/0209445 A1 | 7/2018 | Tantot |

FOREIGN PATENT DOCUMENTS

| | | |
|---|---|---|
| WO | 2013/141930 A1 | 9/2013 |
| WO | 2017/013364 A1 | 1/2017 |

* cited by examiner

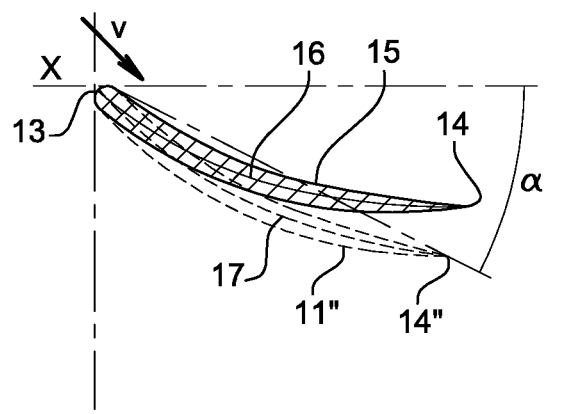
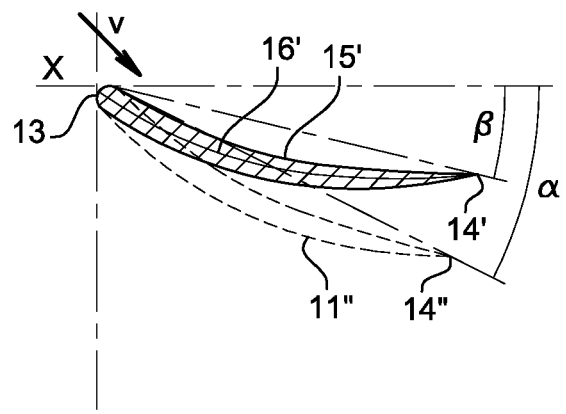
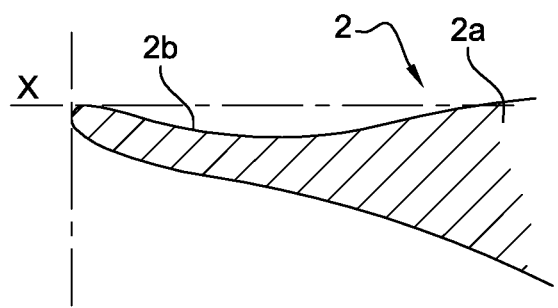
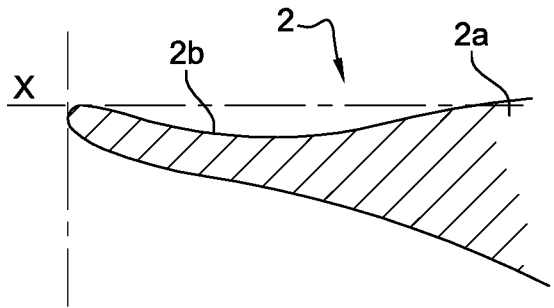
Fig. 3　　　　　　　　　Fig. 4

MODULE OF AN AIRCRAFT BYPASS ENGINE OF WHICH ONE ARM INTEGRATES A STATOR BLADE

TECHNICAL FIELD

The present invention relates to the field of aircraft bypass engines. It relates more particularly to the design of parts, stator blades and structural arms passing through the secondary flow.

STATE OF THE ART

The state of the art comprises, in particular, document WO-A1-2013/141930.

A bypass engine generally comprises, downstream from a fan, an annular row of blades mounted in the secondary flow path to straighten the gas flow and improve the efficiency of the engine. The secondary flow path surrounds the casing of the engine compartment. It is therefore generally passed through by at least one arm securing the casing to an element of the aircraft, for example a pylon under a wing or the rear part of the fuselage. Generally, the row of stator blades is secured upstream from the casing of the engine compartment, as close as possible to the fan in the secondary flow path, and the structural arm is located downstream therefrom.

The presence of the structural arm disrupts the action of the stator blades in at least two aspects. From an aerodynamic perspective, the changes of flow caused by the arm extend to the stator blades, and even to the fan, and damage the functioning thereof. From an acoustic perspective, the arm interacts in an unsteady manner in the wake of the fan and of the stator blades, which creates noise.

The purpose of the invention is to reduce some of these disadvantages associated with the presence of the arm behind the stator blades.

PRESENTATION OF THE INVENTION

The invention relates to a module of an aircraft bypass engine, comprising an annular flow path of a secondary flow of gas wherein is mounted an annular row of stator blades configured to straighten the gas flow, an arm configured to be connected to a pylon securing the engine to the aircraft, said arm extending in said flow path downstream from said annular row of blades and being connected physically to one of said stator blades so as to form a unitary and stationary aerodynamic assembly, characterised in that at least one of the two blades adjacent to the blade of said unitary and stationary aerodynamic assembly is of a variable pitch type and capable of being rotationally moved about a substantially radial axis with respect to a longitudinal axis of the engine.

The fixed juncture between the arm and the blade that is upstream therefrom prevents additional wake interactions due to the presence of the arm. This therefore eliminates a source of noise. Moreover, the variable pitch of the adjacent blade makes it possible to take into account the flow disruption caused by the arm, in order to improve efficiency.

Preferably, the two blades adjacent to the blade of said unitary and stationary aerodynamic assembly are variable pitch type.

Advantageously, the other blades of said row are fixed or, at least, among the other blades of said row, several blades are fixed.

At least one of the blades adjacent to the blade of said unitary and stationary aerodynamic assembly can have an aerodynamic profile identical to that of the other blades of said row.

In an alternative embodiment, at least one of the blades adjacent to the blade of said assembly has an aerodynamic profile that is different from the other blades of said annular row.

Said arm can be used for passage of ancillaries and/or be a structural arm.

The invention also relates to a propulsion unit, comprising an aircraft engine and a pylon for securing the engine to the aircraft, said engine comprising a module such as described above.

The arm of the unitary and stationary aerodynamic assembly can be configured to secure a cowling of the engine to the pylon.

BRIEF DESCRIPTION OF THE FIGURES

The present invention will be best understood, and other details, characteristics and advantages of the present invention will become clearer upon reading the following description, with reference to the appended drawings, wherein:

FIG. 3 schematically shows, in a radial cross-section, the profile of the blade integrated in the arm and of the first adjacent blade of the stator, according to a first alternative embodiment of the invention.

FIG. 4 schematically shows, in a radial cross-section, the profile of the blade integrated in the arm and of the first adjacent blade of the stator, according to a second alternative embodiment of the invention.

DESCRIPTION OF AN EMBODIMENT OF THE INVENTION

Figure 1:
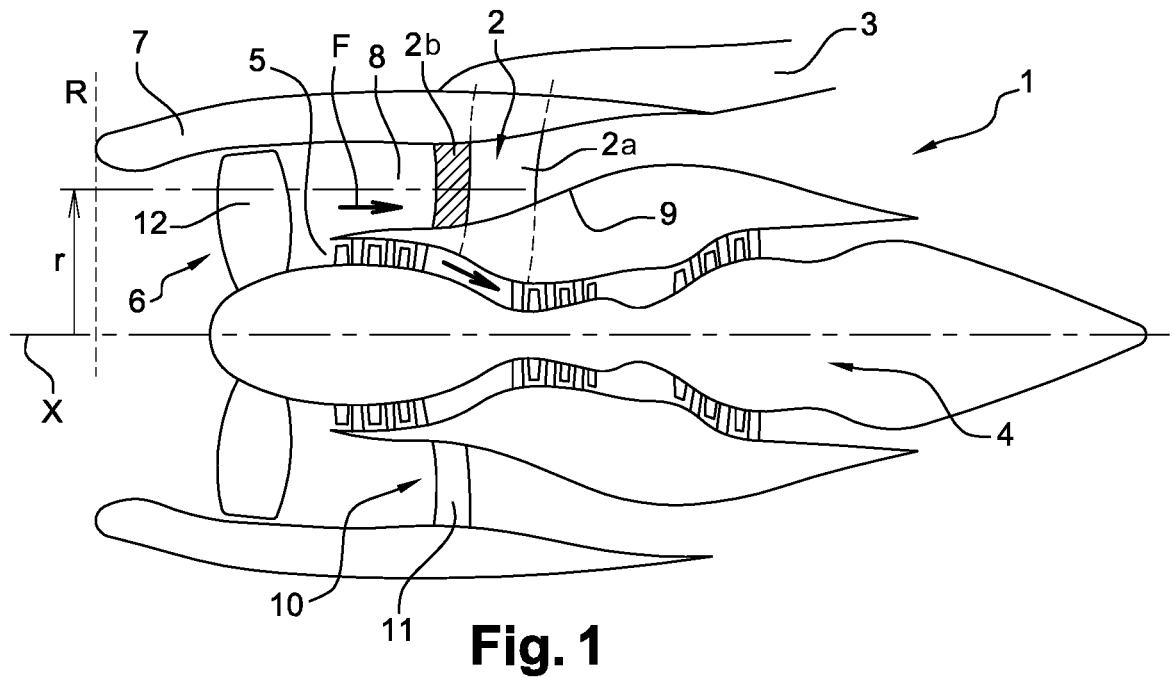
FIG. 1 is a highly schematic axial cross-sectional view of an aircraft engine according to the invention.

FIG. 1 shows the case of a bypass engine 1 secured by an arm 2 to an attachment pylon 3 on the structure of an aircraft, under a wing, for example.

The terms "upstream" and "downstream" are used with respect to the general flow of air along an axis X of the engine. Said engine 1 comprises a power-generating compartment 4 of the turbine engine type supplied with a primary flow by an annular air intake 5. The power-generating compartment 4 comprising at least one high-pressure body and one low-pressure turbine is not detailed here. A casing surrounds these engine elements and ensures, in particular, that they are structurally maintained.

The power-generating compartment drives a propeller 6 placed upstream from the annular air intake 5 of the primary flow. This propeller is shrouded by a nacelle 7 that extends axially around at least one upstream part of the power-generating compartment 4. The secondary flow path 8 is formed between the nacelle 7 and a cowling 9 surrounding the power-generating compartment 4 after the annular air intake 5 of the primary flow. An annular row 10 of stator blades passes through the annular flow path 8, downstream from the annular air intake 5. The purpose of this annular row 10 of stator blades is to straighten the flow of air F driven by the propeller 6 and that passes through the secondary flow path 8.

The arm 2 passes through the secondary flow path 8 downstream from the annular row 10 of stator blades to be secured to the casing of the power-generating compartment 4. In particular, the arm 2 comprises a structural part 2a that is axially offset from the annular row 10 of stator blades, downstream therefrom.

According to the invention, the arm 2 comprises an upstream aerodynamic part 2b that forms one of the blades of the annular row 10 of stator blades. This aerodynamic part 2b passes through the secondary flow path 8, from the cowling 9 to the nacelle 7, as do the other blades 11 of the annular row 10. Advantageously, the aerodynamic part 2b and the structural part 2a are axially connected in a smooth manner, without slope discontinuity, over the entire radial extension of the flow path 8.

Figure 2:
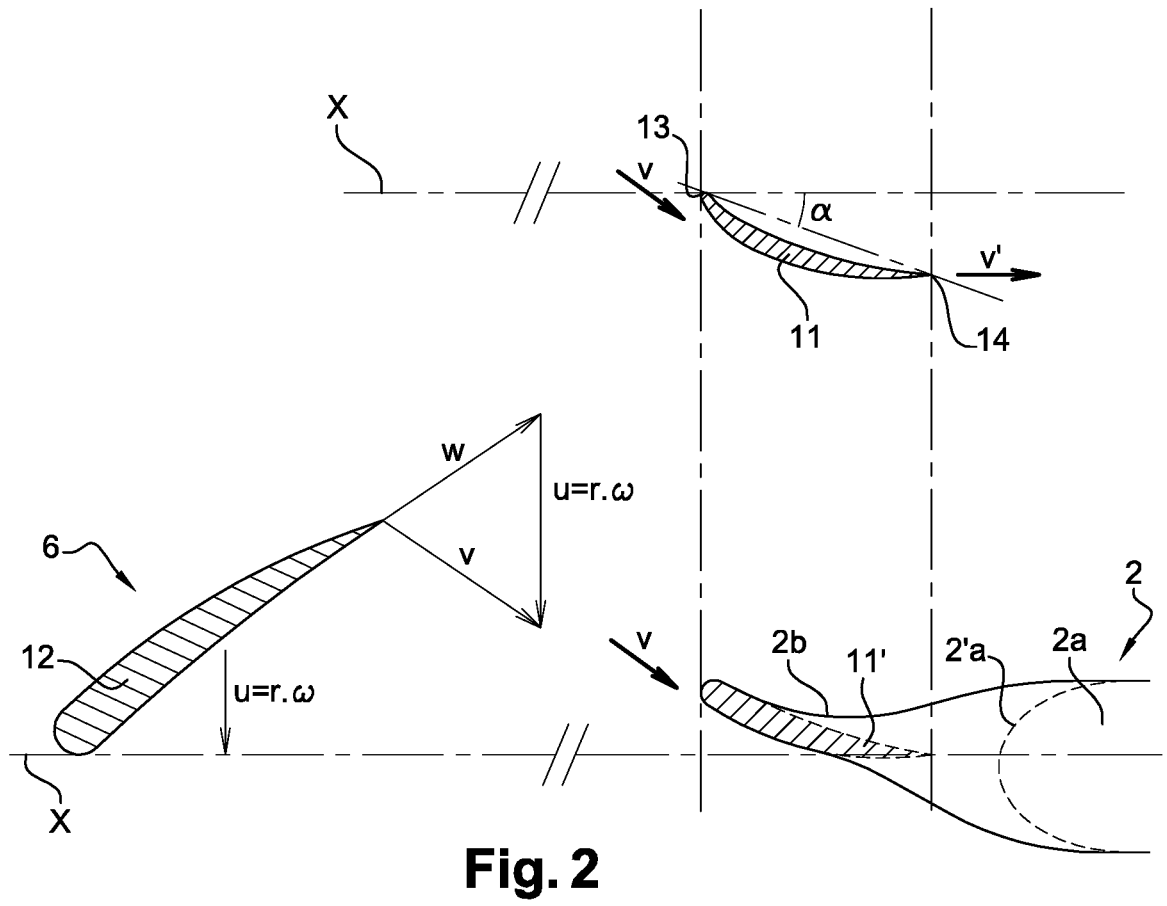
FIG. 2 schematically shows radial cross-sections indicating the profiles of blades of a rotor and of a stator in an engine according to the invention.

With reference to FIG. 2, the blades 12 of the propeller 6 rotating at the speed ω generate a flow, for a given radius r with respect to the axis X of the engine, with a speed v having a significant azimuthal component u, substantially equal to the circumferential speed r·ω of the profile of the blades 12 with a radius r. The blades 11 of the annular row 10 of the stator are configured to influence the flow and to ensure that its speed v' has a low azimuthal component at the output of the annular row 10 of blades.

The blade 11 in the top right corner of FIG. 2 shows the general case of a blade 11 of the annular row 10 of stator blades distant from the arm 2, which undergoes little impact therefrom. The profile thereof perpendicular to the radial direction is curved and adjusted with a pitch angle α. The pitch angle α is the angle formed between the line connecting the leading edge 13 and the trailing edge 14 of the profile and the axial direction X.

The lower right part of FIG. 2 shows the arm 2 integrating in a fixed manner the blade 2b formed upstream by the aerodynamic part thereof. The dotted lines 2'a and 11' show the initial profiles that the structural part 2a of the arm and the stator blade would have if the latter had not been integrated. The stator blade would essentially have the same profile 11' and the same pitch as the blade 11 of the general case. The structural part 2a would have a thick profile, substantially symmetrical about the axial direction X and shaped to minimise the effects thereof on the straightened flow behind the blades 11 of the annular row 10. The structural part 2a is positioned downstream with respect to the aerodynamic part 2b so as to be centred substantially about the position that the trailing edge of the initial profile 11' of the blade would have.

The structural part 2a and the aerodynamic part 2b are deformed with respect to the initial profiles 2'a and 11'. In particular, they are extended axially to come into contact with a continuous connection, advantageously without slope discontinuity on the profile of the assembly. From upstream to downstream, the connection with deformation starts substantially from the point of maximum thickness of the initial profile 11' of the blade on the aerodynamic part 2b, to facilitate the required thickening until the structural part 2a and to minimise the areas of change of curvature on the general profile of the arm 2.

The presence of the arm 2 with an upstream aerodynamic part 2b replacing a blade 11' of the annular row 10 of the stator is a source of distortion of the flow around the blades of the annular row 10 that are close to it. In particular, the thickness of the structural part 2a and of the connection spreads the flow. It is therefore advantageous to change the geometry of one or more blades of the annular row 10, circumferentially on either side of the arm 2, with respect to the geometry of the general case of the blade 11, in order to improve the overall performance of the annular row 10 of blades integrating the aerodynamic part 2b of the arm 2, in particular relating to pressure losses.

FIGS. 3 and 4 show two embodiments where only the blade 15 closest circumferentially to the arm 2, on the bottom side of the aerodynamic part 2b of the arm, is modified. The following blade, not shown, of the annular row of the stator keeps in this case the profile of the blade 11 of the general case shown in FIG. 2.

In FIG. 3, the geometry of the aerodynamic profile of the adjacent blade 15 is modified with respect to that of a blade 11", shown in broken lines, corresponding to the general case whereby it is placed at the same place on the periphery of the annular row 10. In this case, with a blade having a profile with a thickness that varies about a median line called skeleton, from the leading edge to the trailing edge, it is substantially the law of variation of the angle of the skeleton 16 of the blade 15 with respect to the axis X of the engine between the leading edge 13 and the trailing edge 14 that is modified with respect to the skeleton 17 of the blade 11" according to the general case. Here, the skeleton 16 starts with substantially the same angle at the leading edge 10 as in the general case 17, to be adapted to the incoming flow, and arrives with a much lower angle at the trailing edge 14 than in the general case, in order to take into account the disruption caused by the arm 2.

In FIG. 4, the adjacent blade 15' has the same geometry as the blade 11" of the general case placed at the same place, shown in broken lines, but the pitch angle β thereof is modified. Here, the pitch angle β is reduced with respect to the angle α of the general case 11" such that the skeleton 16' at the trailing edge 14' forms an angle with the engine axis X similar to that obtained by changing the geometry of the blade in the preceding figure.

Extensions of the previous alternatives relate to cases where a larger amount of adjacent blades, on the bottom and top sides, with respect to the aerodynamic profile of the arm, are modified. In a preferred embodiment, the same number of blades is modified on the top side as on the bottom side. The number of modified blades can range from four to eight, it being noted that an annular row 10 of stator blades of the straightener behind the propeller 6 also comprises ten blades.

A third alternative, not shown, generalises the alternative of FIG. 4 in the case where all the blades of the annular row 10, with the exception of the blade integrated in the arm, are designed to be of the variable pitch type. The design of an annular row of variable pitch blades can be advantageous to optimise the performance of the straightener based on the speed of the engine. In this alternative, the control system of the variable pitch blades is designed to provide, at the same position of the pitch change actuator, a pitch angle that is different from that of the adjacent blades, based on the location thereof with respect to the arm 2. The pitch angle variation law can therefore be adapted at least for the blades of the annular row that are azimuthally close to the arm.

The invention has been presented in the case where the main purpose of the arm 2 is to connect the engine 1 to the attachment pylon of the aircraft's structure. This arm can also be used for the passage of ancillaries towards the engine. Furthermore, the invention is also applicable in a configuration where the engine is attached differently to the aircraft and the arm in question is used for the passage of ancillaries between the engine and the nacelle.

The invention claimed is:

1. A module of an aircraft bypass engine, comprising:
an annular flow path of a secondary gas flow wherein is mounted an annular row of stator blades configured to straighten the secondary gas flow,
an arm configured to be connected to a pylon securing the engine to the aircraft, said arm extending in said annular flow path downstream from said annular row of stator blades and being connected physically to one of said stator blades so as to form a unitary and stationary aerodynamic assembly,
wherein at least one of the two stator blades adjacent to the blade of said unitary and stationary aerodynamic assembly is of a variable pitch type and capable of being rotationally moved about a substantially radial axis with respect to a longitudinal axis of the engine.

2. The module of an aircraft bypass engine according to claim 1, wherein the two stator blades adjacent to the blade of said unitary and stationary aerodynamic assembly are variable pitch type.

3. The module of an aircraft bypass engine according to claim 1, wherein another stator blade of said annular row of stator blades are fixed.

4. The module of an aircraft bypass engine according to claim 1, wherein, other stator blades of said annular row of stator blades, several stator blades are fixed.

5. The module of an aircraft bypass engine according to claim 1, wherein at least one of the stator blades adjacent to the blade of said unitary and stationary aerodynamic assembly has an aerodynamic profile identical to that of an another stator blades of said annular row of stator blades.

6. The module of an aircraft bypass engine according to claim 1, wherein at least one of the stator blades adjacent to the blade of said assembly has an aerodynamic profile different from that of an another stator blades of said annular row of stator blades.

7. The module of an aircraft bypass engine according to claim 1, wherein said arm is an arm for the passage of ancillaries.

8. The module of an aircraft bypass engine according to claim 1, wherein said arm is a structural arm.

9. A propulsion unit, comprising an aircraft engine and a pylon for securing the engine to the aircraft, said engine comprising a module according to claim 1.

10. The propulsion unit, according to claim 9, wherein the arm of the unitary and stationary aerodynamic assembly is configured to secure a cowling of the engine to the pylon.

11. The module of an aircraft bypass engine according to claim 1, wherein the module is a fan module of the aircraft bypass engine.

12. The module of an aircraft bypass engine according to claim 1, wherein the variable pitch blade adjacent to the blade of said unitary and stationary aerodynamic assembly is arranged within the annular flow path of the secondary gas flow.

13. The module of an aircraft bypass engine according to claim 1, wherein the arm comprises an upstream aerodynamic part and a downstream structural part.

14. The module of an aircraft bypass engine according to claim 13, wherein the upstream aerodynamic part forms said blade of the unitary and stationary aerodynamic assembly and the downstream structural part is offset axially from the annular row of stator blades.

15. The module of an aircraft bypass engine according to claim 13, wherein the aerodynamic part and the structural part are axially connected without slope discontinuity over the entire radial extension of the secondary gas flow path.

16. The module of an aircraft bypass engine according to claim 1, wherein the annular row of stator blades ten stator blades, said ten stator blades including between four to eight variable pitch blades.

* * * * *